Patented Apr. 15, 1952

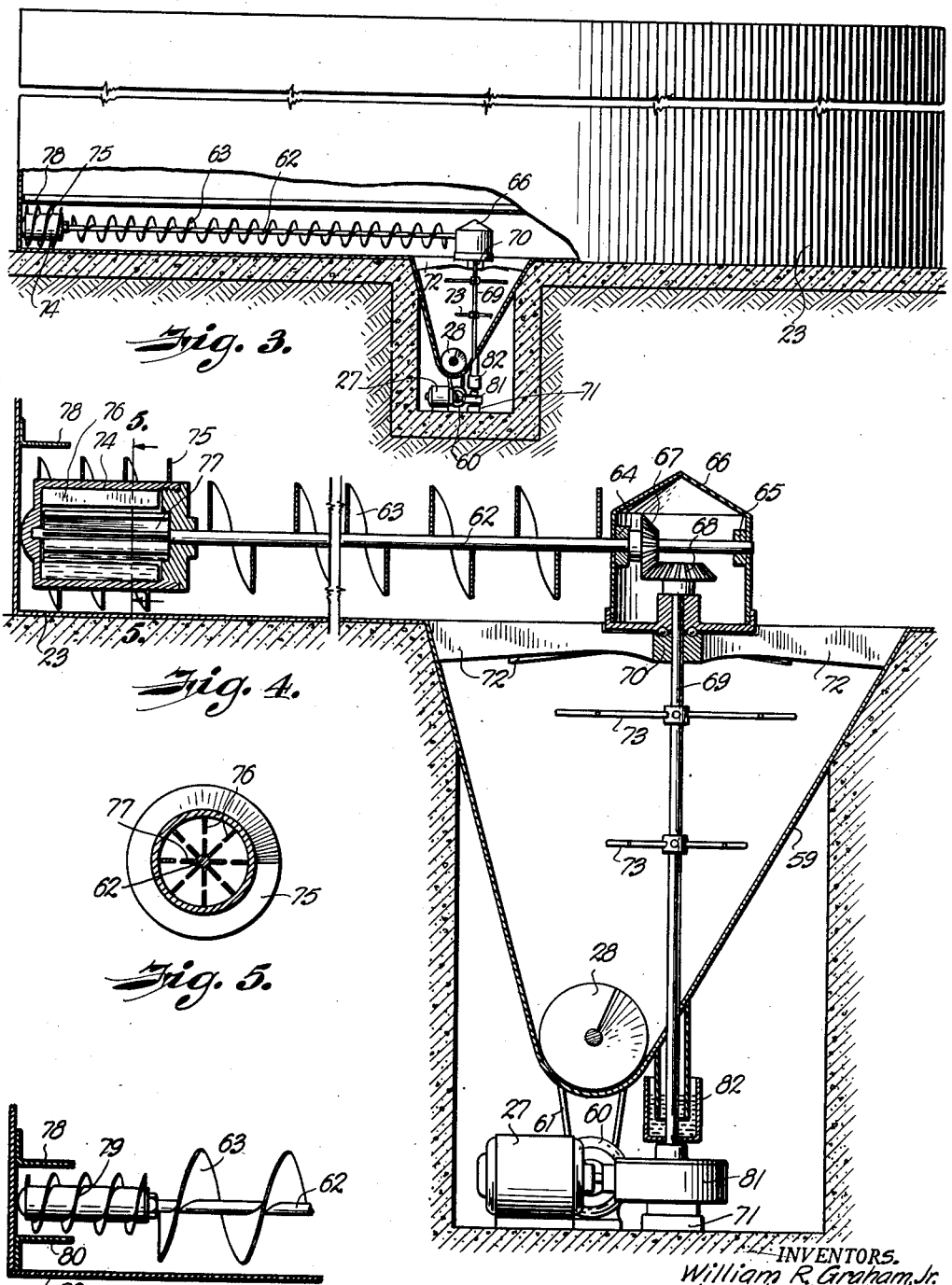

2,592,559

UNITED STATES PATENT OFFICE 2,592,559

APPARATUS FOR CHARGING AND STORING MATERIALS

William R. Graham, Jr., Wilmette, Ill., and Joseph Chrisman, Kansas City, Mo., assignors to American Dairies Incorporated, Kansas City, Mo., a corporation of Maryland, and The Quaker Oats Company, Chicago, Ill., a corporation of New Jersey, jointly Original application February 17, 1945, Serial No. 578,506. Divided and this application March 20, 1950, Serial No. 150,578

16 Claims. (Cl. 214—17)

This invention relates to improvements in a process and apparatus for charging and storing materials and refers more particularly to charging and storing facilities for granular or pulverized dry materials which deteriorate in an atmosphere of air. The present application is a division of our copending application, Serial No. 578,506, filed February 17, 1945, titled "A Process and Apparatus for Charging and Storing Materials."

To limit and prevent in so far as is possible storage deterioration it is proposed to contact and intimately intermix materials to be stored with an inert gas and introduce the products to storage while maintaining a surrounding gaseous atmosphere. The gas is charged with the materials and remains as a preserving atmosphere while the products remain in storage.

The present invention has been devised as an improvement over and method and apparatus disclosed in Patents 2,351,853 dated June 20, 1944, and 2,353,029 dated July 4, 1944. Besides providing an apparatus for mixing the materials to be stored with an inert gas prior to introducing the materials to a storage vessel there is also furnished storage which is easily emptied and within which a gas atmosphere is constantly maintained.

One object of the invention is the preliminary mixing of the material to be stored with the inert gas.

Another object is the sealing of the mixing stage from the storage receptacle by a congestion of the solids which permits passage of the solid material while retarding appreciably passage of the gas.

Another object is the employment of a screw conveyor pivoted at one end centrally of the storage vessel and driven both axially and as a sweep over the bottom of the storage tank to evacuate material from all parts of the tank.

A further object is to provide plugs of packed or congested material in the storage inlet and outlet which permit introduction or discharge of materials without seriously affecting the gas atmosphere in which the materials are stored.

Other and further objects of the invention will appear from the description which follows.

Figure 1:
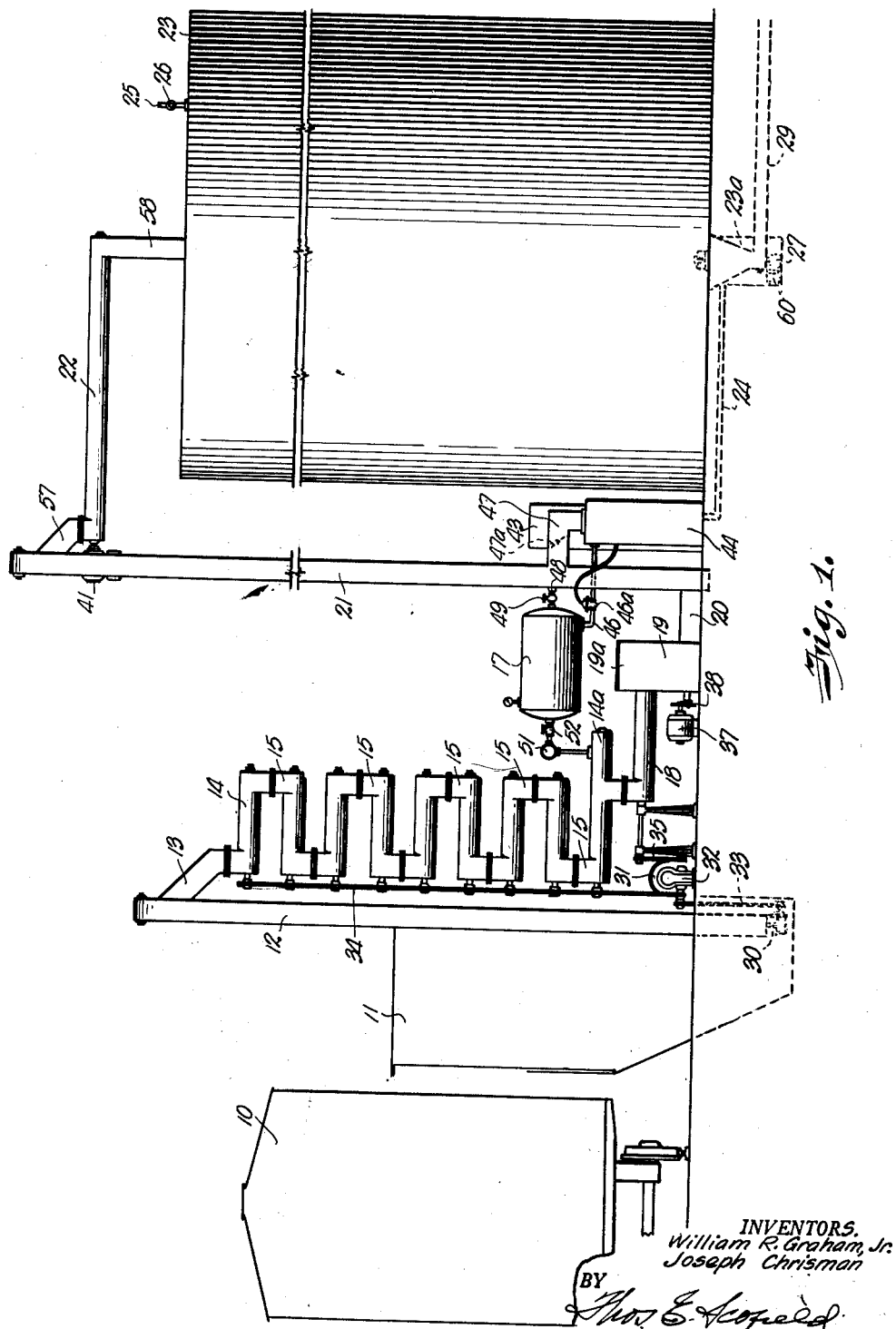
Figure 2:
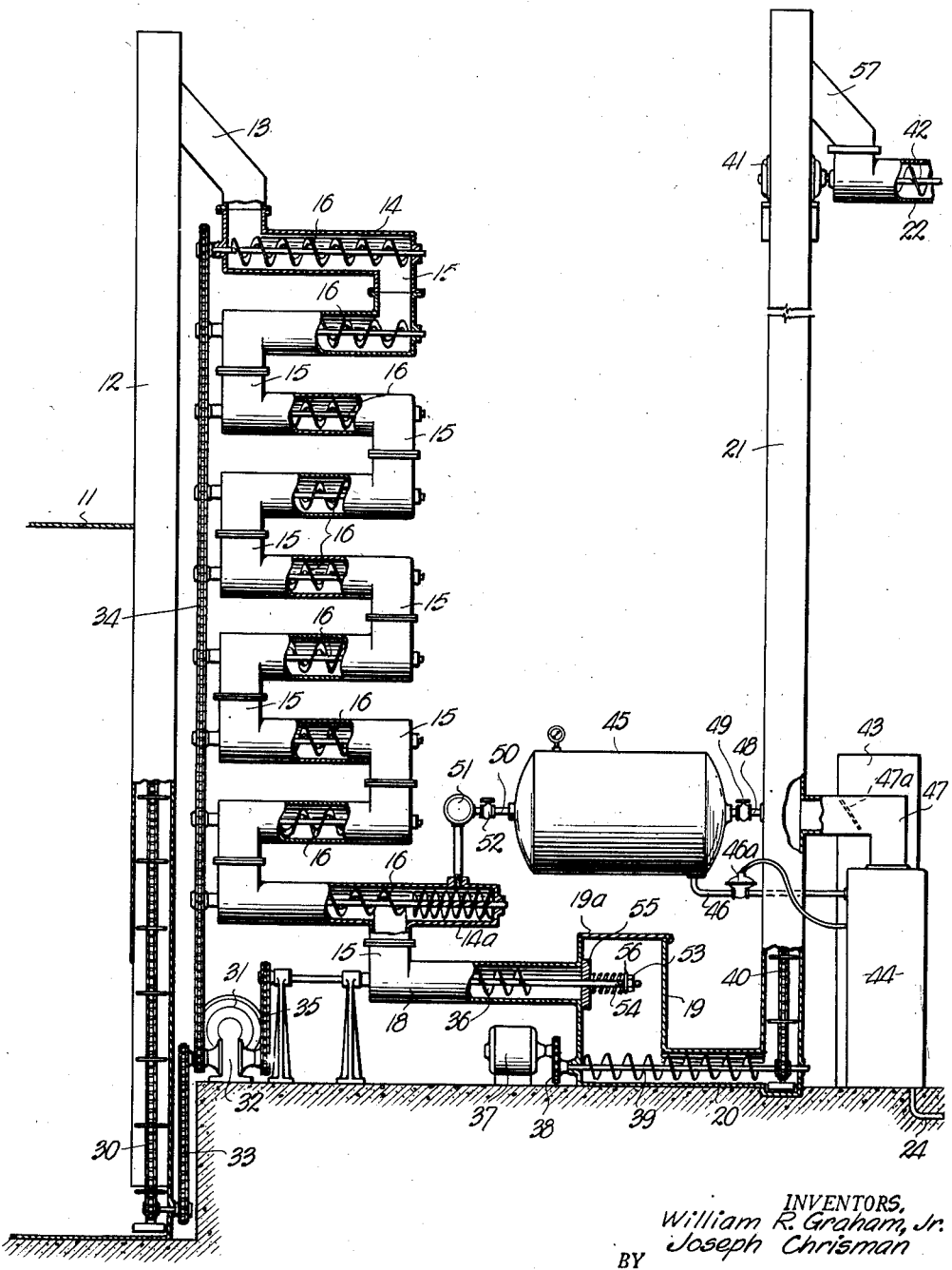

In the accompanying drawings which form a part of the instant specification and are to be read in conjunction therewith and in which like reference numerals are used to indicate like parts in the various views, Fig. 1 is a diagrammatic side elevational view of an apparatus embodying the invention, Fig. 2 is an enlarged detail of the charging mechanism, Fig. 3 is an enlarged view showing the mechanism for evacuating the storage vessel, Fig. 4 is an enlarged detail of the drive and clutch mechanism which forms a part of the apparatus shown in Fig. 3, Fig. 5 is a view taken along the line 5—5 in Fig. 4, and Fig. 6 is a modified type of construction for the outer extremity or free end of the screw conveyor shown in Figs. 3 and 4.

To simplify the description and to render more easily comprehensible the apparatus shown in the various views, it may be conveniently separated into three major parts, namely, the charging apparatus, the storage vessel or tank, and the discharge mechanism.

A brief description of the apparatus shown in Fig. 1 will facilitate an understanding of the invention and, by following the passage of the material through the system, it is believed that the advantages and features of novelty will be more readily comprehended. In the description, ground or pulverized dehydrated forage crops such as grass or alfalfa have been selected as the materials to be stored. It is to be understood, however, that the invention is not to be limited to the storage of these materials since it is applicable and usable as well in the storage of all kinds of grain, flour, ground hay, ground corn cobs, chemicals, coffee, or any pulverized material which deteriorates when stored in an atmosphere of air.

Referring to Fig. 1, the materials to be stored are unloaded from a railway car diagrammatically shown at 10 from which they are passed through a chute or pipe into the enclosed loading dock 11. From the bin in the bottom of the dock the materials are picked up by an elevator leg 12 through which they are passed upwardly and discharged through transfer duct 13 into a plurality of connected conveyor or mixing tubes 14. These tubes are serially connected by crossovers 15 to form a continuous passage for the materials from the upper tube to the lower tube 14a. Within each mixing tube is an open flight conveyor screw 16 pitched to cause continuous flow and agitation of the material through the tubes from top to bottom. Into the lower mixing tube 14a is introduced inert gas, such as carbon dioxide, from a storage tank 17. The gas is passed counterflow to the direction of flow of the solid materials through the mixing tubes 14, transfer pipe 13, and elevator 12 and eliminates air surrounding the material during its passage in contact therewith. Upon discharge from the lower mixing tube 14a the materials are compacted in a congester tube 18 after which they are discharged into receptacle 19 and transported through conveyor 20, elevator 21, and conveyor tube 22 into storage tank 23. The function of the congester 18 is to permit passage of solids to the storage tank charging system but retard and hinder passage of gas, since it is desired to cause the gas to flow upwardly through the mixing tubes to precondition the material by driving off the surrounding air. Prior to charging the material to be stored to storage vessel 23, the tank is flushed by introducing inert gas through pipe 24 into the bottom of the tank and exhausting air from the top of the tank through vent pipe 25 controlled by valve 26. In removing stored material from the tank 23, motor 60 is started and products accumulated in the conical bottom 23a of the tank are forced out by conveyor screw 28 which is driven by the motor. Material compacted in the tube 29 by the conveyor screw produces a seal permitting discharge of the solids while limiting loss of gas to an inconsequential amount. Thus, the seals established in the congester 18 and the discharge tube 29 assure the maintenance of an inert gas atmosphere within the tank since only a very slight pressure amounting to an inch or two of water is adequate upon the storage vessel.

The charging mechanism for introducing the material to the storage vessel and surrounding it with an atmosphere of inert gas is detailed in Fig. 2. The endless chain 30 carrying the elevator flights or buckets within the leg 12 is driven from motor 31, worm and gear mechanism 32 and sprocket chain 33. From this same source of power is taken the chain drive 34 which operates the conveyor screws 16 within the mixing tubes. A separate chain drive 35, taken from the same power source, operates conveyor screw 36 in congester tube 18. Motor 37 through gears 38 drives a screw 39 in tube 20 which transports the material from the collector 19 into the bottom of the elevator leg 21. Chain 40, upon which are mounted the buckets or flights which elevate the material in the tube 21, is driven by a sprocket mounted on the end of the shaft which carries the conveyor screw 39. At the top of elevator leg 21 is a bracket which carries motor 41. This motor drives the conveyor screw 42 located in tube 22 and moves the material raised by leg 21 from the elevator to the storage vessel 23.

Inert gas is produced in a gas manufacturing unit 43 and is charged by compressor 44 to storage tank 45 through pipe 46. Interposed in this line is a pressure control valve 46a which regulates the pressure in tank 45 by cutting the compressor unit on and off in order to maintain proper pressure in the tank. A pipe 24, as previously suggested, is connected into the bottom of the storage tank to chart inert gas thereto while air is being vented through pipe 25. A duct 47 connecting the compressor with the elevator leg 21 furnishes a means for removing inert gas from the leg and introducing it to the compressor where it is recompressed for use in the storage vessel or charging mechanism. A valve or damper 47a regulates the amount of gas withdrawn from the leg and prevents exhausting the gas atmosphere therein below a predetermined minimum. Inert gas is supplied to the elevator leg 21 from tank 45 through pipe 48 controlled by valve 49. A pipe 50 connecting tank 45 with the lower mixing tube 14a provides the connection for introducing inert gas into the mixing tube. A metering device 51 and a valve 52 are positioned in the line 50 to control the flow of inert gas.

In operation, material is picked up from the loading dock bin and is passed upwardly through the elevator leg 12 and discharged through pipe 13 into the upper mixing tube. The conveyor screws in the tubes move the material through the successive tubes in a continuous travel and mix it with the atmosphere of inert gas. Note that the pitch of the conveyor screw flights in the successive tubes is reversed so that the material passes in one direction in the upper tube through the crossover and in a reverse direction in the tube below. On arriving at the bottom tube 14a it is discharged through a final crossover 15 into the congester tube 18. Any type of mixing device through which the material and gas are passed countercurrently to remove air from the material particles and surround them with an inert atmosphere is contemplated. The effectiveness of such mixing and the time of contact are the factors of importance. An extension of the screw conveyor 36 within the tube 18 is threaded to receive a nut 53. This nut 53 confines a coil spring 54 between the valve 55 and a washer 56. Spring 54 tends to constantly urge the valve against the discharge end of tube 18. As the material is moved through tube 18 it is compacted and congested within the tube by the screw acting against the force of the coil spring against the closure plate or valve 55. The compacted material in the tube retards the passage of gas since it acts as a plug in the tube causing the gas to flow through the path of least resistance upwardly through the mixing tubes 14. To prevent obstruction by an accumulation of solids in the gas line 50, where it enters tube 14a, there is provided a series of conveyor screw flights having their pitch reversed with respect to the other flights on the screw. The action of the flights with the reverse pitch is to move solids, tending to accumulate in the end of tube 14a, away from the gas pipe and into the discharge crossover.

After being forced through the valve 55 the solids accumulate in collector box 19 equipped with a hinged top 19a which makes the valve mechanism and conveyor screws accessible for inspection and repair. From the collector the materials are moved by conveyor screw 39 into the elevator leg and are transferred from the top of the leg through pipe 57 into the horizontal conveyor tube 22. The discharge from this conveyor tube is through pipe 58 into the top of the storage vessel.

An explanation will now be given of the evacuating mechanism for removing the materials from the bottom of the storage vessel, the details of which are shown in Figs. 3, 4, 5 and 6. Centrally of the bottom of the storage vessel is a conical-shaped well 59 which is shaped at its bottom to receive the discharge tube 29 in which conveyor 28 rotates. The drive for the conveyor 28 is from motor 60 through reduction gearing not shown and belt 61. At the end of conveyor screw 28 is a valve arrangement similar to that shown at 55 in Fig. 2 so that the material discharged through tube 29 is congested and compacted into a plug to prevent appreciable loss of storage gas.

To avoid the necessity of building the storage vessel 23 with a steep hopper bottom there is provided in the vessel a screw conveyor pivoted at the center, rotatable both on its axis and as a sweep over the bottom of the vessel. This conveyor screw comprises a horizontal shaft 62 upon which are flights 63 connected as a continuous thread or screw pitched to move the material radially toward the center of the storage vessel. The shaft 62 of the conveyor screw bears at 64 and 65 in a housing 66 positioned centrally of the vessel. Mounted on shaft 62 is a bevel gear 67 which meshes with gear 68 on vertical shaft 69. The vertical shaft rotates in an upper bearing 70 and a lower step bearing 71. Upper bearing 70, gear housing 66 and the driven end of the screw conveyor are supported by arms 72 which radially span the top of the conical well 59. Extending radially from shaft 69 are mixing arms 73 which prevent bridging of the material in the well and assure a constant supply to the conveyor screw 28.

On the outer end of the conveyor screw shaft is mounted a fluid coupling or torque converter comprising an outer casing or housing 74 free to rotate upon the shaft and on the periphery of which are conveyor screw flights 75 of somewhat greater diameter than flight 63. Within the housing are radial vanes 76 which extend only a portion of the distance between the housing and the shaft, as shown in Fig. 5. Fixedly mounted near the end of the shaft 62 and within the housing are vanes 77 extending radially from the shaft and adapted to register or align with the vanes 76 in the housing at one point in their rotation, as shown in Fig. 5. Within the housing and surrounding these vanes is a hydraulic fluid which, under the influence of the rotating inner vanes, imposes a torque on the outer vanes and thus tends to cause the housing to rotate with the conveyor shaft. Since the flights 75 on the housing roll upon the floor of the storage vessel the conveyor screw will not only be rotated axially but will rotate about its pivoted center as a sweep over the bottom of the storage vessel floor. By virtue of the fluid coupling, the sweep is always urged forwardly but only at such a rate as the conveyor screw 63 can clear a path for itself by feeding the material inwardly toward the well 59; that is to say, if the floor is relatively barren, the sweep will advance quite rapidly, but when the material in the bin offers substantial resistance to such advance, the fluid coupling will permit slip or lost motion between the conveyor shaft and the housing 74, so that the conveyor screw can continue to turn about its own axis at the same speed but will advance circumferentially more slowly. The fluid coupling thus is a flexible variable speed-ratio torque converter or power transmission acting in principle much like a slip clutch. Flights 75 act not only as rollers for the outer end of the conveyor screw but clear a path adjacent the wall of the tank or vessel by moving the material toward the center of the storage vessel besides rotating the sweep. In this type construction there is positioned upon the inner wall of the vessel above the end of the screw an angle 78 forming a continuous ledge which prevents the screw from climbing during its travel about its pivot. The modified construction shown in Fig. 6 substitutes screw 79 of smaller diameter for the larger diameter flights and fluid coupling mechanism shown in Fig. 4. In this modification the smaller screw rotates between shelves or ledges 78 and 80, being supported on the lower ledge 80 and prevented from climbing by the upper ledge 78. These ledges or rings extend entirely around the interior of the vessel and serve as supports and guides for the free end of the conveyor sweep. In either construction whether flights of larger diameter or smaller diameter be used at the end of the conveyor screw the function of the auxiliary flights is the same, namely, to support the shaft against the weight of material so the main screw will not build up a friction load in the bottom of the tank and to clear its own path free of material.

The fluid coupling is important primarily from the viewpoint of minimizing wear on the conveyor apparatus and storage tank. In other words, it is desirable and useful though not essential to the operation of the discharge mechanism.

The drive for the screw conveyor shaft 62 is from motor 27. Motor 27 through a worm and gear 81 drives a vertical shaft 69. Shaft 62 is driven from the vertical shaft through bevelled gears 67 and 68. A liquid seal 82 prevents loss of gas where shaft 69 enters the conical well 59.

In operation, when it is desired to remove material from the storage vessel motors 27 and 69 are started. Screw 28 moves material accumulated in the well 59 out through the discharge tube 29 where it is compacted in the form of a plug before being discharged to prevent loss of the storage gas. To prevent arching or bridging of the material in the conical well and failure of supply to the conveyor 28 the rotating conveyor shaft 62 tends to continuously move material along the floor of the storage vessel into the well. Bridging of the material around the screw is prevented by rotation of the conveyor screw about its pivot so material from the storage vessel is fed uniformly from all parts of the vessel into the central well.

It is recognized that the conception of a radial screw conveyor rotatable both upon its axis and as a sweep within a storage vessel is known. Such an arrangement has been practiced with varying degrees of success. The use, however, of conveyor screw flights of greater diameter at the outer end of the screw and the employment of a fluid coupling or variable speed torque converter is believed to be novel over what has gone before. Also the use of a coupling mechanism in connection with the screw conveyor to produce periodic or continuous operation of the sweep is a unique arrangement over conventional practice.

The proposed arrangement will satisfactorily unload material which does not flow freely from storage bins constructed with flat bottoms and permits the use of a storage vessel of greater capacity in the same amount of space besides reducing the cost of construction of the vessel.

From the explanation it will be seen that there is provided a system in which ground material subject to deterioration on storage in air is first passed through a charging mechanism wherein the air atmosphere is exhausted and an inert atmosphere substituted. In this charging mechanism occluded air about the particles is removed and the material advanced through a plug into a storage vessel. In the storage vessel an inert atmosphere is continuously maintained by the plug in the charging mechanism and a plug continuously maintained in the discharge outlet. To remove the material from the storage a conveyor screw, pivoted centrally of the storage vessel, is rotated upon its axis and as a sweep over the floor of the vessel in order to move material uniformly from all parts of the storage tank into a central well. From the well the material is discharged through a compacting conveyor tube where loss of gas from the storage vessel is prevented.

From the foregoing it will be seen that the invention is well adapted to attain all of the ends and objects hereinbefore set forth together with other advantages which are obvious and are inherent to the system.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having thus described our invention we claim:

1. An evacuating mechanism for tanks in which are to be stored material sluggishly flowable comprising a screw conveyor radially positioned adjacent the tank bottom and pivoted at one of its ends centrally of the tank, a power source drivingly connected to the conveyor and adapted to rotate the conveyor upon its axis, traction mechanism at the outer end of the conveyor for moving the conveyor around its pivot in a rotative sweep over the tank bottom, a coupling between said conveyor and said traction mechanism whereby the rotation of said conveyor is transmitted to said mechanism to drive same, and said coupling constructed and arranged to permit lost motion between said conveyor and said mechanism when said material resists the advance of said traction mechanism.

2. In combination with a bin having a floor, a central pivot with an elongated screw conveyor extending radially outward therefrom, the outer end of the conveyor rotatably mounted in and supported by a wheel so the conveyor is spaced slightly above the floor throughout its length, a source of power connected to the inner end of the screw conveyor for rotating same about its own longitudinal axis, and power transmission means between the conveyor and wheel operative at times to transmit the conveyor's rotation to said wheel thereby to cause the end of the conveyor to advance along the floor in an arcuate path about said pivot as a center.

3. A combination as in claim 2 wherein said power transmission means comprises a variable speed-ratio torque converter.

4. A combination as in claim 2 wherein said power transmission means is constructed and arranged to permit lost motion between said conveyor and said wheel when the material in the bin offers resistance to the advance of the conveyor in said arcuate path.

5. A combination as in claim 2 wherein said wheel has a screw thread tread.

6. A combination as in claim 2 wherein said power transmission means comprises two sets of vanes one connected to the wheel and the other connected to the conveyor, and a body of liquid common to the vanes for transmitting the motion of one set to the other.

7. In combination with a bin having a floor, a sweep mechanism adapted to move in a circular path over the floor, said mechanism comprising a pivot central of the floor, a pair of coaxial screw conveyors connected end to end for independent rotation about their common axis, said conveyors being of different diameter, means for anchoring the end of the smaller conveyor to said pivot so the smaller conveyor is supported above the floor between the larger conveyor and the pivot, a source of power connected to the anchored end of the smaller conveyor to rotate same about its longitudinal axis, and power transmission means between the two conveyors operative at times to transmit the smaller conveyor's rotation to the larger conveyor.

8. A combination as in claim 7 wherein said power transmission means comprises two sets of vanes connected to the respective conveyors, and a body of liquid common to the vanes for transmitting the motion of one set to the other.

9. In combination with a bin having a floor, a central pivot with an elongated screw conveyor extending radially outward therefrom, said conveyor having at its outer end a shaft extension encircled by a hollow container rotatably mounted on said extension, vanes on the interior of said container and on said shaft extension, a source of power connected to the inner end of said screw conveyor for rotating same about its longitudinal axis, and a body of liquid in said container adapted at times to transmit the rotation of the vanes on the shaft extension to the vanes on the container.

10. A combination as in claim 9 wherein said container is a hollow cylinder coaxial with said screw conveyor and having a screw flight on the exterior of the cylinder.

11. In combination with a bin having a floor, a central pivot with an elongated screw conveyor extending radially outward therefrom, a second screw conveyor coaxial with said first conveyor and connected to the outer end thereof for independent rotation about the common axis of the two conveyors, a support for said second conveyor encircling said central pivot whereby said second conveyor upon rotation is adapted to travel in an orbit about said pivot, said support and said second conveyor constructed and arranged to maintain said common axis of the two conveyors elevated above said floor by a distance exceeding the radius of the flights of said conveyor whereby said first conveyor is spaced above the floor, a source of power connected to the inner end of said first conveyor for turning it about its own axis, and power transmission means between the two conveyors at times causing said second conveyor to turn with said first conveyor and at other times permitting said first conveyor to turn alone.

12. A combination as in claim 11 wherein said power transmission means comprises a variable speed-ratio torque converter.

13. A combination as in claim 11 wherein said power transmission means is constructed and arranged to permit lost motion between said conveyors when the material in the bin offers resistance to the advance of the conveyors in said orbit.

14. A combination as in claim 11 wherein said power transmission means comprises a fluid coupling.

15. A combination as in claim 11 wherein the flights of said first conveyor are smaller in diameter than the flights of said second conveyor.

16. A combination as in claim 11 wherein the flights of said first conveyor are larger in diameter than the flights of said second conveyor.

WILLIAM R. GRAHAM, Jr.
JOSEPH CHRISMAN.

REFERENCES CITED

The following references are of record in the file of this patent:

UNITED STATES PATENTS

| Number | Name | Date |
|---|---|---|
| 1,275,558 | Holmgreen | Aug. 13, 1918 |